Jan. 10, 1939.   M. D. COULTER   2,143,187
REFRIGERATION
Filed Dec. 6, 1935   2 Sheets-Sheet 1

Inventor:
Marion D. Coulter
By Williams, Bradbury, McCaleb & Hinkle,
Attys.

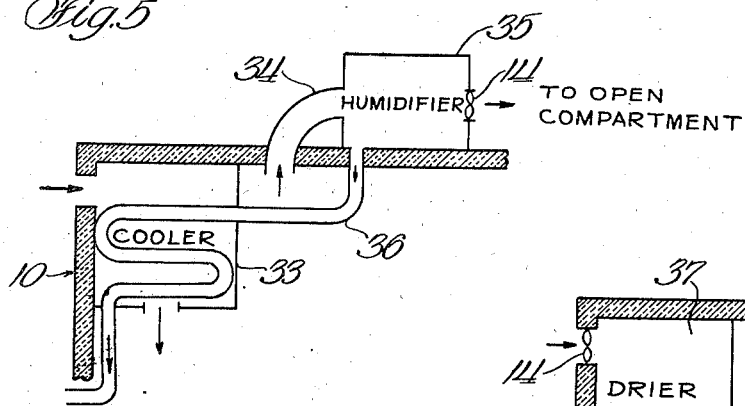
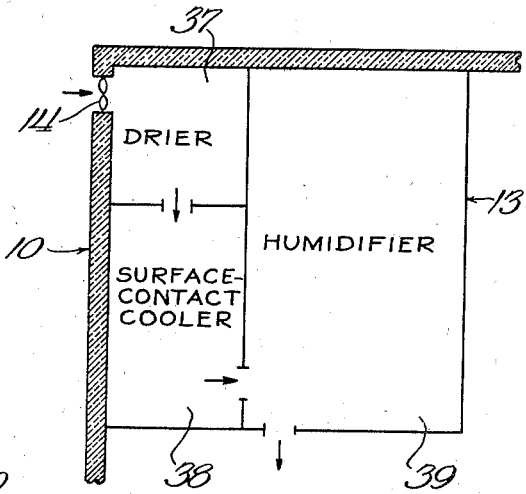
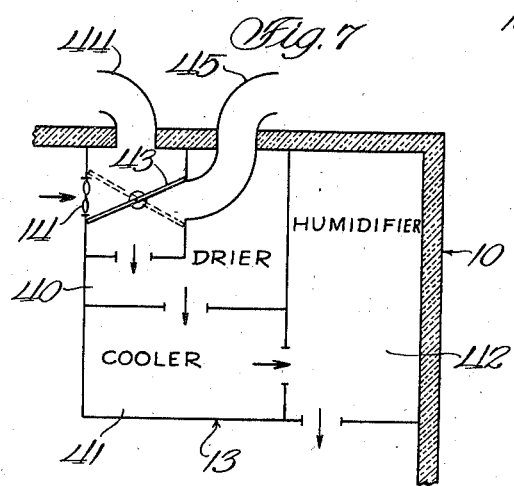
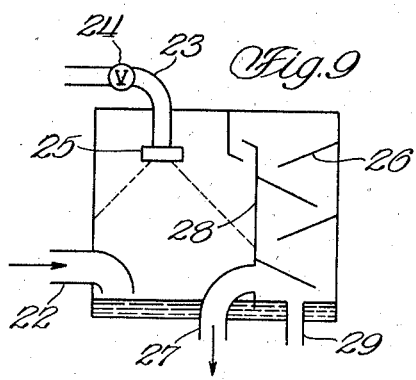
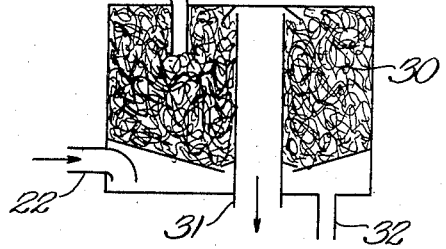

Patented Jan. 10, 1939

2,143,187

UNITED STATES PATENT OFFICE 2,143,187

REFRIGERATION

Marion D. Coulter, Pittsburgh, Pa., assignor to Toledo Scale Manufacturing Company, Toledo, Ohio, a corporation of New Jersey Application December 6, 1935, Serial No. 53,130

6 Claims. (Cl. 62—89)

Refrigeration has not heretofore been used successfully for preservation of produce, because of certain difficulties that have been encountered. For example, the atmosphere of a mechanical refrigerator is so dehydrating that it makes susceptible kinds of produce, such as leafy vegetables, unsalable in the course of two or three days. It has been found, moreover, that produce cannot be preserved properly in an air-tight receptacle in a refrigerator. Circulation of air into contact with the produce is necessary to prevent it from deteriorating, because it is alive, and because, unlike meat, it must be kept alive and healthy if it is to remain in salable condition.

Accordingly, the atmosphere of refrigerators containing produce has been allowed to circulate into contact with it, and sprinkling or dampening of the produce has been resorted to in an effort to retard its dehydration. Yet wetting the surface of a plant of any kind clogs its breathing pores and kills the vegetational tissue beneath the pores by cutting off the air supply. When this tissue is no longer alive, it acquires an altered appearance. Thus leafy tissue, such as spinach, becomes slimy; buds, such as head lettuce, swell, burst, and acquire a musty odor; and other tissue becomes rusty or otherwise discolored. In addition the tissue becomes highly susceptible to the attack of bacteria and mold, so that its deterioration accelerates upon its removal from the refrigerator. And it must be removed therefrom during the day if it is still in the hands of the retailer, because the sale of produce is so slow as to be unprofitable unless it is kept on open display racks.

As a matter of fact, no satisfactory system whatsoever for preserving produce has been available. By reason of the lack of such a system, the retailer must throw out unsold produce after as little as two days on his shelves. Thus there is a spoilage loss of 25 to 75% in each lot of produce merchandised, and the total annual spoilage loss in the United States amounts to about fifty million dollars. The want of a preservation system is also responsible for the shortness of the season for which each product is available in quantity, and for the prevalence of the practice of substituting undesirable artificially ripened products.

The retailer must now supply himself with a surplus of produce above his needs, because the consequence of understocking is immediate and permanent loss of trade. If he could keep each lot of produce in marketable condition for only a few days longer than at present, he would be able to sell each day's surplus on succeeding days, so that his losses would be substantially reduced. The local retailer is also prevented from introducing an unfamiliar type of vegetable or fruit to his customers by fear of prohibitive spoilage losses during the period in which sales are slow, before the community has become acquainted with the new product.

The invention contemplates a departure from the prior practices that have been described. In the use of the novel system of refrigeration hereinafter disclosed, it is not necessary either to cut off air circulation from produce being refrigerated, or to moisten the produce. The principal object of the invention is to provide a system of refrigeration that can be successfully applied to products of the soil. More specific objects and advantages are apparent from the description, in which reference is had to the accompanying drawings illustrating preferred apparatus for carrying out the invention.

Fig. 1 of the drawings is a diagrammatic section of a compartment embodying the invention;

Fig. 5 is a diagrammatic section of a corner of a compartment containing a refrigerating apparatus embodying the invention;

Fig. 6 is a diagrammatic section of a corner of a compartment containing a second refrigerating apparatus embodying the invention;

Fig. 7 is a diagrammatic section of a corner of a compartment containing a third refrigerating apparatus embodying the invention;

Fig. 8 is a diagrammatic section of a humidifier that may be used in the practice of the invention;

Fig. 9 is a diagrammatic section of a second type of humidifier.

Figure 1:
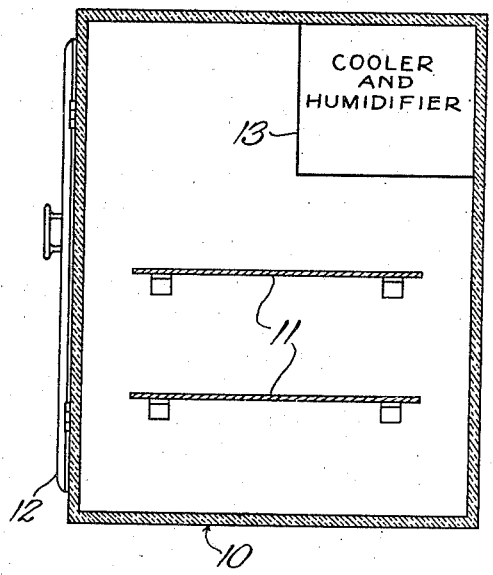

These specific drawings and the specific description that follows merely disclose the illustrative applications of the invention, and are not to impose limitations upon the claims.

Refrigerating systems operating in accordance with the invention are particularly applicable to preservation of vegetational tissues, such as roots, bulbs, tubers, stems, leaves, flowers and fruits, that deteriorate by transpiration of their fluid constituents. Whatever the form of cooling system that is used, the temperature of the air surrounding the produce is preferably maintained between 32 degrees and 60 degrees F., and its relative humidity is preferably kept in a certain range that has been discovered to be very effective for keeping the vegetational tissue in a living and healthy condition. It has been found that there is a narrow critical range of relative humidity below which green produce suffers rapid dehydration and above which there occurs a hitherto unobserved phenomenon which may be termed "dew formation". This phenomenon has been found to give much less trouble when the temperature is held below 60 degrees F. In addition to reducing dew formation, the maintenance of a reduced temperature by a cooling or refrigerating apparatus has been found to eliminate the mold growth that flourishes at higher temperatures and to retard the respiration of the produce and the internal chemical changes that are connected with it.

It has not heretofore been recognized that harvested produce is subject to an accumulation of water on its surface that is due neither to deposition of mist particles nor to condensation produced by temperature differential. Yet it has now been discovered that certain produce, particularly when it consists of succulent tops with roots attached, as in the case of radishes and onions, is subject to an accumulation of moisture or "dew" that leads to the disastrous consequences that have been stated to flow from water films on the surface of produce.

It is believed that the dew is caused by exudation of moisture upon the surface of the plant that has risen from the ample reservoir of liquid in the roots. Dew formation can be prevented by the maintenance of a relative humidity below a certain value that depends upon other factors, such as rate of air flow. If the relative humidity is kept low enough to prevent dew formation on the type of produce named, no similar difficulty is experienced with other kinds of produce stored in the same compartment.

The preferred method of delicately controlling relative humidity within this narrow range close to saturation is carried out by adjusting the relative humidity of a stream of air and passing the air over the produce, so that the proper relative humidity is attained through evaporation from the produce while the air is in contact therewith. Thus, a close adjustment of the relative humidity in a closed compartment may be carried out by regulation of the relative humidity of the incoming air over a wide range.

The rate of circulation of the air has been found to be important as well as the relative humidity, so that both of these factors may be controlled in order to prevent dew formation. In fact, it is possible for the relative humidity to be kept constant while the rate of circulation is maintained just high enough to prevent both the dew formation and the rapid dehydration.

The relative humidity in a mechanical refrigerator may fall as low as 25 to 30%. In a series of comparative experiments produce was found to deteriorate almost as rapidly in a mechanical refrigerator as when kept in air having a relative humidity of 10 to 20%, like that sometimes encountered in arid western states.

In one of the experiments an assortment of vegetables was kept in an ordinary domestic refrigerator at 39 degrees to 43 degrees F., the refrigerator being opened once each day for examination of the produce. The following observations were made:

*Spinach.*—Wilted badly in 24 hours and was unusable as food in three days.

*Celery.*—Wilted slightly in 24 hours and was limp in 48 hours. After nine days it could be partially restored by soaking at length in cold water.

*Carrots.*—The tops wilted rapidly. The tuber became limp and was unusable after the fourth day. Could not be restored by soaking in water after the ninth day.

*Green peas.*—The pod took on a dry and wilted appearance very gradually. When examined at the end of the ninth day the peas on the interiors of the pods were dry and tough, had developed a brown color in numerous cases, but showed limited shrinkage.

*Beets.*—The tops shrank rapidly at the end of nine days, the beet was badly withered and did not bleed when cut but recovered very well when soaked in water.

*Head lettuce.*—Exterior appearance suggested that a considerable shrinkage of head lettuce had occurred. Investigation showed that the major portion of the loss had occurred from the outer layers of the head and that the interior was in fair condition with no appreciable mustiness apparent.

In another experiment an assortment of vegetables was kept in a domestic refrigerator at 40 degrees to 44 degrees F. At the end of the first and of the second day, the vegetables were examined. Then they were left in the refrigerator for four more days with the door remaining shut. Deterioration of the produce took place in the same manner as in the first experiment described, and the percentage weight loss found upon each examination of the specimens is tabulated below for comparison with the percentage losses of vegetables refrigerated in accordance with the invention.

| Period in days | Loss in percentage of initial weight | | | | | |
|---|---|---|---|---|---|---|
| | Spinach | Green peas | Green beans | Green onions | Celery | Carrots |
| 1 | 31.0 | 7.9 | 8.0 | 8.6 | 13.9 | 7.8 |
| 2 | 41.0 | 14.5 | 12.8 | 13.3 | 21.8 | 12.0 |
| 6 | 68.0 | 39.5 | 36.9 | 32.4 | 56.9 | 39.3 |

| Period in days | Loss in percentage of initial weight | | | |
|---|---|---|---|---|
| | Head lettuce | Beets | Red radishes | White radishes |
| 1 | 6.5 | 20.3 | 36.4 | 26.9 |
| 2 | 10.7 | 22.8 | 45.1 | 36.3 |
| 6 | 26.1 | 42.1 | 71.6 | 65.9 |

The effect of sprinkling vegetables lightly and placing them in a container in a refrigerator was also determined. Although slight circulation of the air of the refrigerator into contact with the produce was permitted in order to keep it alive, serious deterioration took place. Beet tops and spinach became slimy and water-logged in three days although sprinkled very slightly. Numerous small, scarcely noticeable discolored spots on green pea specimens were greatly increased in size by contact with water. Celery suffered an undue loss of crispness, because of moisture loss. In the case of head lettuce, rustiness of the outer leaves developed, so that they had to be removed.

A series of experiments were also conducted to find out how the humidity in a closed compartment can be maintained in the desired critical range. For the storage compartment a cabinet was employed that had a volume of one cubic foot, approximately one-third of which was occupied by the produce, supported on shelves. A temperature of 50 degrees to 55 degrees F. was maintained and air was introduced at a lower corner and withdrawn at a diagonally opposite upper corner, at the rate of 8 cubic feet per hour.

When the air was introduced in a substantially saturated condition, the weight losses of the vegetables were inappreciable, and they remained in excellent condition for six days, with the exception of green onion tops and radish tops, which suffered from dew formation and consequent decomposition. A fresh batch of vegetables was then placed in the cabinet and the air flowing into it at the rate of 8 cubic feet per hour was bubbled through several saturated solutions of $Na_2CO_3.10H_2O$ in series. When the air flowing from the solutions to the cabinet was tested with a wet and a dry bulb thermometer, a relative humidity of 96 to 97% was found. The relative humidity of the air surrounding the produce in the cabinet was undoubtedly higher than that of the entering air because of the evaporation from the produce.

Except for moderate dew formation, which occurred even when the relative humidity of the entering air was 96 to 97%, the vegetables remained in excellent condition for six days. The relative humidity of the entering air was then adjusted to 87% by passing the air through successive saturated solutions of sodium chloride. During a period of six days while the air was entering at 87% relative humidity, a fresh assortment of vegetables in the cabinet was preserved in fully salable condition. Spinach and celery lost only a little of their crispness, and dew formation on green onions and red radishes was largely eliminated. All the other vegetables remained unchanged in appearance during the run.

The loss of moisture from each of the vegetables in three days and in six days during each of the three runs is noted below:

| Percent relative humidity | Loss in percentage of initial weight in 3 days | | | | | |
|---|---|---|---|---|---|---|
| | Spinach | Green peas | Green beans | Green onions | Celery | Carrots |
| 100 | 0.0 | 0.0 | 1.0 | 1.9 | 1.5 | 1.7 |
| 97 | 0.5 | 3.0 | 2.0 | 1.4 | 1.2 | 0.8 |
| 87 | 8.0 | 3.0 | 3.0 | 0.7 | 1.3 | 0.4 |

| Percent relative humidity | Loss in percentage of initial weight in 3 days | | | | | |
|---|---|---|---|---|---|---|
| | Head lettuce | Parsnips | Red radishes | Asparagus | Cauliflower | Beets |
| 100 | 1.3 | 1.1 | 3.3 | 1.9 | 0.4 | |
| 97 | 0.4 | 0.0 | 2.0 | 1.4 | 0.7 | 1.7 |
| 87 | 1.4 | 1.2 | 5.6 | 0.8 | 0.8 | 4.0 |

| Percent relative humidity | Loss in percentage of initial weight in 6 days | | | | | |
|---|---|---|---|---|---|---|
| | Spinach | Green peas | Green beans | Green onions | Celery | Carrots |
| 100 | 0.0 | 1.0 | 1.0 | 2.9 | 1.5 | 2.5 |
| 97 | 0.5 | 4.0 | 3.0 | 2.7 | 2.2 | 1.6 |
| 87 | 13.0 | 5.0 | 5.0 | 0.7 | 3.8 | 0.4 |

| Percent relative humidity | Loss in percentage of initial weight in 6 days | | | | | |
|---|---|---|---|---|---|---|
| | Head lettuce | Parsnips | Red radishes | Asparagus | Cauliflower | Beets |
| 100 | 1.7 | 1.6 | 6.0 | 2.4 | 0.6 | |
| 97 | 0.4 | 0.0 | 3.6 | 2.5 | 1.0 | 2.5 |
| 87 | 1.4 | 2.4 | 8.6 | 1.7 | 1.1 | 4.4 |

The experiments showed that the relative humidity of the atmosphere in which produce is stored should be high enough to prevent dew formation on vegetables such as radishes and low enough to prevent rapid dehydration of the other vegetables. Thus, when a cabinet of the size used in the experiment is employed, with a temperature of 50 to 55 degrees F., air entering at a rate sufficient for a complete change of the air every five minutes should have a relative humidity of about 85% in case red radishes are present. Although air of 85% relative humidity entering at the stated rate does not cause serious dehydration of the produce, the air should be introduced at about 90% relative humidity whenever the cabinet contains green onions but not radishes. Other produce in the cabinet will keep even better if the air is introduced at 95% relative humidity—a value that is permissible when both green onions and red radishes are absent.

When the same cabinet was kept at 50 degrees F., it was found that 4 cubic feet of air per hour could be introduced at 84% relative humidity to keep a group of vegetables in excellent condition, for six days. The weight losses of each vegetable found by daily measurement, is stated below:

| Period in days | Loss in percentage of initial weight | | | | | |
|---|---|---|---|---|---|---|
| | Spinach | Green peas | Green beans | Green onions | Celery | Carrots |
| 1 | 3.4 | 0.9 | 0.8 | 0.8 | 2.8 | 1.5 |
| 2 | 4.2 | 1.8 | 0.8 | 0.8 | 3.5 | 2.1 |
| 3 | 5.1 | 1.8 | 1.6 | 1.7 | 4.2 | 2.5 |
| 4 | 5.9 | 2.7 | 1.6 | 1.7 | 5.2 | 2.7 |
| 5 | 6.7 | 2.7 | 2.4 | 1.7 | 5.9 | 2.9 |
| 6 | 7.6 | 2.7 | 2.4 | 1.7 | 5.9 | 3.1 |

| Period in days | Loss in percentage of initial weight | | | |
|---|---|---|---|---|
| | Head lettuce | Red radishes | White radishes | Asparagus |
| 1 | 1.0 | 1.3 | 1.1 | 0.6 |
| 2 | 1.0 | 2.3 | 1.9 | 1.3 |
| 3 | 1.5 | 2.4 | 2.4 | 1.9 |
| 4 | 1.0 | 4.4 | 3.7 | 1.9 |
| 5 | .5 | 4.4 | 3.7 | 2.2 |
| 6 | 3.0 | 4.7 | 3.7 | 2.2 |

The data tabulated below were obtained in a preservation experiment conducted at 50 degrees to 55 degrees F., in which the flow of humidified air was kept down to 0.12 cubic feet per hour:

| Period in days | Loss in percentage of initial weight | | | | |
|---|---|---|---|---|---|
| | Spinach | Green peas | Green beans | Celery | Carrots |
| 1 | 2 | −2 | −2 | 1.1 | 1.1 |
| 2 | 3 | −1 | −2 | 1.1 | 1.3 |
| 3 | 5 | −1 | −2 | 1.5 | 1.8 |
| 4 | 6 | −1 | −2 | 1.5 | 2.1 |
| 5 | 7 | 0 | −2 | 1.9 | 2.4 |
| 6 | 8 | 0 | −2 | 1.9 | 2.7 |

| Period in days | Loss in percentage of initial weight | | | |
|---|---|---|---|---|
| | Head lettuce | Parsnips | Tomatoes | Broccoli |
| 1 | 0.2 | 0.0 | 0.0 | 0.7 |
| 2 | 0.5 | 0.0 | 0.0 | 1.0 |
| 3 | 1.0 | 0.0 | 0.0 | 1.0 |
| 4 | 1.2 | −0.5 | 0.0 | 1.0 |
| 5 | 1.2 | −0.5 | 0.0 | 1.3 |
| 6 | 1.4 | −0.5 | 0.0 | 1.3 |

A flow of 0.12 cubic feet per hour is about the least that can be used. Even when the cabinet was opened only once a day, the produce lost moisture at an appreciable rate, as shown by the above table. A humidifier of the same size was used in a subsequent experiment carried on at the same temperature, to humidify a volume of air of 4.4 cubic feet per hour passing to the cabinet. Highly satisfactory preservation of the produce for six days resulted. Because of the more rapid air flow, and also probably because of failure of the humidifier to bring the 4.4 cubic feet per hour flow as close to saturation as the 0.12 cubic feet per hour flow, the losses of weight, tabulated below, were similar to those produced by the smaller rate of air flow.

| Period in days | Loss in percentage of initial weight | | | |
|---|---|---|---|---|
| | Spinach | Green peas | Green beans | Green onions |
| 1 | 0 | −2.0 | −1.0 | 0.0 |
| 2 | 0 | −2.0 | −1.0 | 0.0 |
| 3 | 0 | −2.0 | −1.0 | 0.0 |
| 4 | 0 | −2.0 | −1.0 | 0.0 |
| 5 | −0.5 | −2.0 | −1.0 | 2.5 |
| 6 | −1.0 | −2.0 | −1.0 | 2.5 |

| Period in days | Loss in percentage of initial weight | | | | |
|---|---|---|---|---|---|
| | Celery | Carrots | Beets | Head lettuce | Parsnips |
| 1 | 1.5 | 0.5 | 0.5 | 0.5 | 1.0 |
| 2 | 3.0 | 1.5 | 1.5 | 1.5 | 1.0 |
| 3 | 3.5 | 1.5 | 1.5 | 1.5 | 1.0 |
| 4 | 3.5 | 1.5 | 1.5 | 1.5 | 1.0 |
| 5 | 3.5 | 2.0 | 1.5 | 2.0 | 1.0 |
| 6 | 4.0 | 2.0 | 1.5 | 2.5 | 1.0 |

Simultaneously with the last experiment described, a determination was carried out of the effect of storing produce in a walk-in mechanically refrigerated cooler containing several hundred pounds of ice. After six days of storage, the produce in the cooler had deteriorated substantially in quality. In addition to some substantial moisture losses, deposition of moisture through dew formation or condensation was observed. This moisture caused sliming of succulent tops, and it is probable that the relative humidity, rate of air circulation, and other conditions prevailing in the cooler were unsuitable. The daily weight losses of the produce in the cooler are tabulated below:

| Period in days | Loss in percentage of initial weight | | | |
|---|---|---|---|---|
| | Spinach | Green peas | Green beans | Green onions |
| 1 | 8.5 | 0.0 | 0.5 | 2.5 |
| 2 | 11.5 | 1.5 | 1.0 | 4.5 |
| 3 | 13.5 | 2.0 | 1.5 | 4.5 |
| 4 | 15.0 | 2.0 | 2.0 | 7.5 |
| 5 | 17.0 | 3.0 | 3.0 | 7.5 |
| 6 | 18.5 | 4.0 | 5.0 | 9.5 |

| Period in days | Loss in percentage of initial weight | | | | |
|---|---|---|---|---|---|
| | Celery | Carrots | Beets | Head lettuce | Parsnips |
| 1 | 6.0 | 3.5 | 2.5 | 2.0 | 1.0 |
| 2 | 7.5 | 4.5 | 3.5 | 2.5 | 2.0 |
| 3 | 9.5 | 5.5 | 5.5 | 3.0 | 2.5 |
| 4 | 11.5 | 7.5 | 6.5 | 3.0 | 2.5 |
| 5 | 13.0 | 9.0 | 7.5 | 3.5 | 3.0 |
| 6 | 14.5 | 9.5 | 8.5 | 4.0 | 3.5 |

In the preferred system for refrigerating products of the soil in a closed compartment, the compartment 10, which may be provided with shelves 11 and a door 12 that opens for access to the interior, is equipped with a cooler and humidifier 13 for maintaining a temperature in the compartment between 32 degrees and 60 degrees F. and a relative humidity in the critical range in which there is neither dew formation on succulent tops with roots attached nor substantial dehydration of the products.

Figure 2:
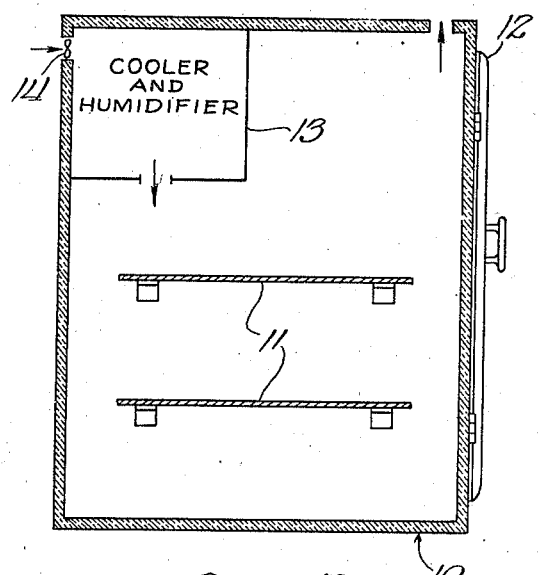
Fig. 2 is a diagrammatic section of a modified compartment embodying the invention.

A device such as a fan 14 may also be provided for passing the air from the cooler and humidifier through the compartment rapidly enough to avoid a temperature rise sufficient to cause substantial dehydration of the products, as shown in Fig. 2. When the system in Fig. 2 is employed, there is no danger of condensation of moisture upon the products, because the cooler is located in the path of the incoming air. After the air has been cooled, its temperature can only rise while it is in contact with the produce, so that condensation of moisture is impossible. The rise in temperature of the air in the compartment is at the same time kept as small as possible, in order to reduce the dehydrating effect of the air upon the produce. It is the practice of the retailer to expose produce in open display racks and produce so exposed has been found to sell faster than when kept under glass.

Figure 3:
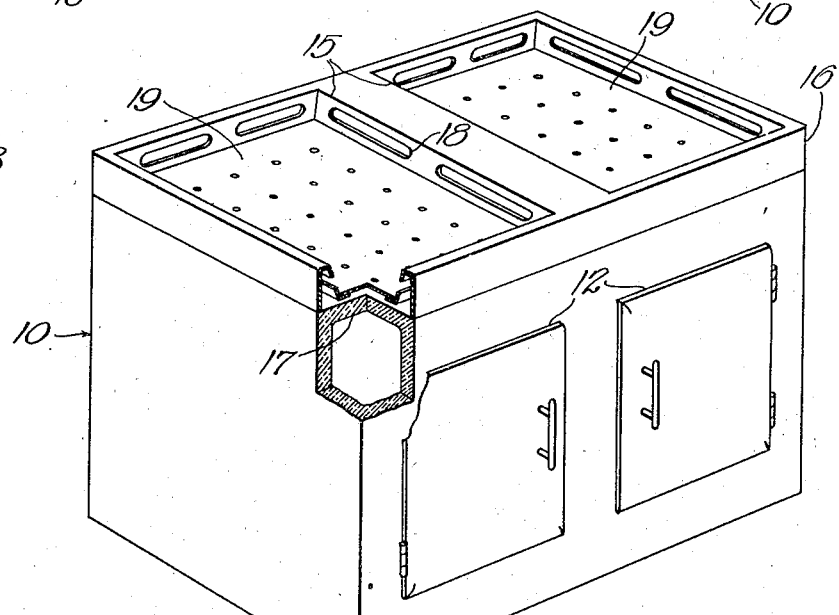
Fig. 3 is a perspective view of a compartment embodying the invention, surmounted by two display compartments.

The invention is applicable to the preservation of produce in open compartments, such as the compartments 15 in Fig. 3, which are open at the top. The compartments shown in Fig. 3 are formed in a rack 16 which may be conveniently mounted upon the roof 17 of a closed compartment 10 so that the system that supplies air to the closed compartment may be used to supply air also to the display compartment. Humidified air, containing substantially no liquid particles, is passed over the produce on display rapidly enough to prevent a substantial rise in its temperature so that dehydration of the produce is avoided. At the same time the currents of humidified air keep the dry air of the atmosphere out of contact with the produce.

The sides of the rack 16 may be hollow and provided with openings 18 for the egress of humidified air flowing through the sides of the rack. To support the produce there may be a removable perforated plate 19 spaced from the floor of the rack 16 to provide additional passage for the humidified air.

When the produce rests upon a perforated plate, it does not become bruised or marked by the perforations, as it does when a screen or grating is used for a support. If desired, however, the perforations in the plate 19 may be omitted and the air may be supplied through the apertures 18 alone; or the perforations alone may be used for the egress of the air. The size of the perforations should be so proportioned that the flow of air through each of them is approximately the same. If the apertures 18 are employed, they should also be of such size relative to one another that an even distribution of air is secured.

Figure 4:
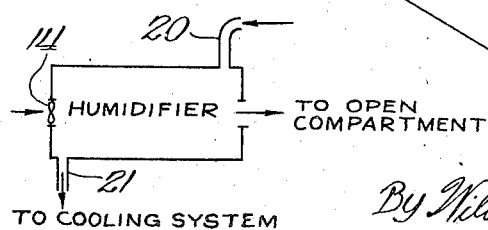
Fig. 4 is a diagrammatic section of a portion of a refrigerating apparatus embodying the invention.

For supplying humidified air to the display compartments, the humidifier diagrammatically illustrated in Fig. 4 may be provided, having a fan 14 for withdrawing air from the atmosphere and forcing it through the humidifier to the display compartment. Water may be supplied to the humidifier through a pipe 20, and the surplus water from the humidifier that has been considerably cooled by the evaporation may be drawn through a pipe 21 to the cooling system for the closed compartment. There it can be used very advantageously either in a coil for direct cooling of the air in the closed compartment, or to carry away heat from a mechanical refrigerating system.

The humidifier used in the system may include an inlet 22 through which a current of air is introduced, directed downwardly to prevent egress of water (Figs. 8 and 9). The humidifier may be supplied with running water through a water inlet 23 controlled by a valve 24. In the form shown in Fig. 9, the stream of air is humidified by passage through a spray issuing from a spray head 25. For a spray to treat 25 cubic feet per hour, a flow of water of about 0.6 gallons per hour is sufficient.

Air that is passed through a spray emerges heavily laden with liquid particles. If the air is then brought into contact with produce, a film of water is deposited upon the surface thereof so that all the serious consequences follow that have been described at the beginning of the specification.

Thus, it is preferable for the air to be humidified without the introduction of a substantial amount of liquid particles. Means for substantially excluding particles of liquid water from the air may be provided, such as the mist-separating baffles 26 over which the air passes on its way to the outlet 27. In the humidifier of Fig. 9, the system of baffles is separated from the spray chamber by a partition 28 extending nearly to the top of the humidifier and having its lower edge dipping below the surface of the water level that is maintained in the bottom by the overflow spout 29.

In another type of humidifier that may be used to supply air free from mist, the air merely passes over an extended surface of water, such as that provided by the glass wool 30 in the chamber of Fig. 8. Thus, the air is humidified without picking up liquid particles. It may be passed upward through the saturated glass wool and withdrawn at the top of the humidifier through a central outlet duct 31, and the surplus water may be drained through an outlet 32.

In the preferred refrigerating system for supplying air to both a closed and an open compartment, the air is passed through a cooler 33 into the closed compartment, as shown in Fig. 5, and after passing through the closed compartment is withdrawn through a passage 34 to a humidifier 35 and supplied to the open compartment. Additional means, such as the pipe 36, is preferably provided for supplying to the cooler water that has been used in the humidifying means as in the apparatus of Fig. 4.

It has been found highly advantageous to employ a drier 37 for dehydration of the air before it enters the cooler and humidifier because the humidification of the air that has previously been dehydrated cools it to a considerable extent and results in a great reduction in the cost of operating the cooling device. The drier is particularly advantageous when a surface contact apparatus 38 is employed for refrigeration of the air before it enters a humidifier 39, because the drier materially decreases the difficulties that arise from frosting or condensation upon the surface contact apparatus. Thus, the latter apparatus may be operated for greatly increased periods of time without defrosting, if it is maintained at a freezing temperature, or the problem of disposing of condensed moisture is simplified if the surface contact apparatus operates at a temperature above freezing.

The preferred refrigerating system for the compartment, diagrammatically shown in Fig. 7, consists of a drier 40 from which the air passes through a cooler 41 to a humidifier 42. It has been discovered that a considerable proportion of the air passing through the refrigerating apparatus may be taken from the compartment itself rather than from the outside air, particularly when running water, rather than stagnant water, is employed for humidification of the air. In any case, the amount of air that must be circulated through the cooler, in order that too great a temperature rise may not occur in the compartment, is considerably greater than the amount of fresh air that must be introduced into compartment in order to keep the produce in a healthy condition. Thus, a damper 43 is preferably provided to permit a substantial proportion of the supply of fresh air to be replaced by air recirculated from the compartment, when the wet bulb temperature, or heat contained in the air in the compartment is lower than that of the fresh air. In one extreme position the damper forces the air exhausted from the compartment by the fan 14 to pass to the exterior through an outlet 44 and in the other extreme position it causes this exhausted air to be taken into the drier instead of fresh air drawn through the inlet 45.

The embodiments of the invention that have been disclosed may be modified, and various other systems embodying the substance of the invention may be devised, to meet various requirements.

Having thus described my invention, I claim:

1. In an apparatus of the class described, in combination, a compartment for products of the soil having a closure, an open compartment for products of the soil, means for supplying a stream of air to the open compartment, a humidifier for the stream of air, an apparatus for refrigerating the first compartment, and means for extracting heat in the refrigerating apparatus with water that has been cooled in the humidifier.

2. In an apparatus of the class described, in combination, a compartment for products of the soil having a closure, an open compartment for products of the soil, means for passing air through the first compartment, apparatus for cooling the air entering the first compartment, means for humidifying the air leaving the first compartment and conducting it to the open compartment, and means for extracting heat in the cooling apparatus with water that has been used in the humidifying means.

3. A method of refrigerating products of the soil that comprises cooling and humidifying air to impart to it a temperature between 32° F. and 60° F. and the proper relative humidity for preventing dew formation on succulent tops with roots attached, and passing the air so treated, while substantially free from liquid particles, over the products at such a rate as to maintain a relative humidity that prevents both said dew formation and substantial dehydration of the products.

4. In an apparatus of the class described, in combination, a display compartment open at the top for storage of products of the soil, having air ducts surrounding it at the sides and bottom, means for moderately cooling a supply of air and rendering it substantially saturated and free from liquid particles, means for conducting said supply of air to said ducts, and means for forcing the air through the ducts and through the bed of products in the compartment.

5. A method of refrigerating products of the soil in an open compartment that comprises substantially saturating and thereby cooling a supply of air, excluding liquid particles from the air, shielding the products against untreated atmospheric air currents from below, and passing the air among and across the top of the products rapidly enough to prevent dehydration of the products.

6. A method of refrigerating products of the soil in an open compartment that comprises moderately cooling a supply of air, substantially saturating the air while excluding particles of liquid therefrom, and forcing the air through and across the top of the products rapidly enough to prevent a substantial rise in its temperature while it is in contact with the products, and to keep untreated atmospheric air out of contact with the products.

M. D. COULTER.